United States Patent [19]

Lang

[11] Patent Number: 5,582,264
[45] Date of Patent: Dec. 10, 1996

[54] POWER ASSISTED STEERING SYSTEM, IN PARTICULAR, FOR MOTOR VEHICLES

[75] Inventor: Armin Lang, Schwäbisch Gmünd, Germany

[73] Assignee: ZF Friedrichshafen AG., Friedrichshafen, Germany

[21] Appl. No.: 374,689

[22] PCT Filed: Jul. 21, 1993

[86] PCT No.: PCT/EP93/01926

§ 371 Date: Jan. 24, 1995

§ 102(e) Date: Jan. 24, 1995

[87] PCT Pub. No.: WO94/02345

PCT Pub. Date: Feb. 3, 1994

[30] Foreign Application Priority Data

Jul. 25, 1992 [DE] Germany ........................... 42 24 650.4

[51] Int. Cl.⁶ ................................................. B62D 5/12
[52] U.S. Cl. .................... 180/423; 180/414; 180/441; 180/442
[58] Field of Search ........................... 180/132, 141, 180/143, DIG. 6, DIG. 8, DIG. 16, 403, 410, 414, 417, 421, 423, 441, 442

[56] References Cited

U.S. PATENT DOCUMENTS

| 4,531,602 | 7/1985 | Roehringer | 180/143 |
| 4,557,344 | 12/1985 | Lang | 180/143 |
| 4,637,482 | 1/1987 | Ohashi et al. | 180/132 |
| 4,811,805 | 3/1989 | Yoshida et al. | 180/143 X |
| 4,865,147 | 9/1989 | Uchida | 180/141 |
| 4,940,103 | 7/1990 | Momiyama | 180/143 X |
| 5,147,008 | 9/1992 | Nishimore et al. | 180/143 X |
| 5,220,974 | 7/1993 | Kim | 180/143 X |
| 5,307,895 | 5/1994 | Duffy | 180/143 |
| 5,509,493 | 4/1996 | Lang et al. | 180/132 |
| 5,509,494 | 4/1996 | Lang | 180/132 |
| 5,530,614 | 6/1996 | Lang et al. | 361/154 |

FOREIGN PATENT DOCUMENTS 3122369  12/1982  Germany.
3248252  7/1984   Germany.

*Primary Examiner*—Anne Marie Boehler
*Assistant Examiner*—F. Zeender
*Attorney, Agent, or Firm*—Larson & Taylor

[57] ABSTRACT

A power assisted steering system, in particular, for motor vehicles, contains a servomotor (2), a servopump (3), a tank (4), a control valve (1) with a controllable feedback device (5), and a control member (46) whose choke cross section can be altered as a function of the vehicle speed. Control valve (1) is made as a four-way valve and has a supply connection (22, 23), a feedback connection (7), and two working connections (8, 10) for the lines (11, 12) that lead to the two working chambers of servomotor (2). Between feedback device (5) and supply connection (22, 23), there is arranged a device (13) for piling up the pressure medium stream and the device is made according to one practical example as a choke (50, 51). With the help of this choke (50, 51), one can achieve a hydraulic centering component in addition to a mechanical centering component.

7 Claims, 4 Drawing Sheets

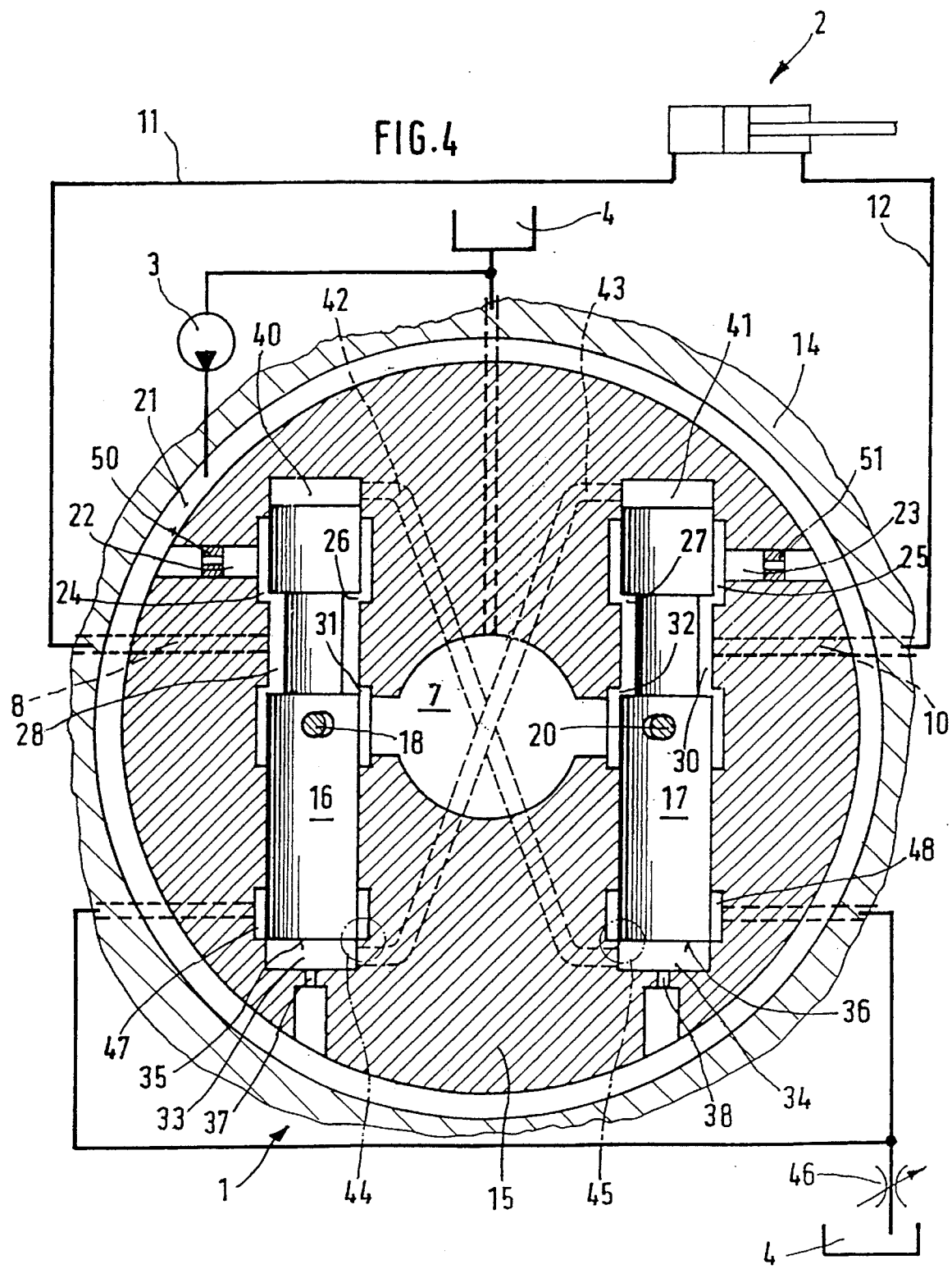

POWER ASSISTED STEERING SYSTEM, IN PARTICULAR, FOR MOTOR VEHICLES

BACKGROUND OF THE INVENTION

1. Field of the Invention

This invention relates to a power assisted steering system, in particular, for motor vehicles. Such a power assisted steering system contains a servomotor, a servopump, a tank, a control valve that steers the pressure medium delivered by the servopump to the servomotor. Besides, the power assisted steering system contains a control member whose choke cross section can be altered as a function of the vehicle speed. The control valve is made as a four-way valve. It is provided with a controllable feedback device and has a supply connection, a feedback connection, and two working connections for the lines leading to the two working chambers of the servomotor.

2. Description of the Prior Art

Such a power assisted steering system is known from DE-C2-31 22 369. In this power assisted steering system, the hydraulic feedback action can be altered during operation, for example, via the vehicle tachometer as a function of the vehicle speed. That results in a characteristic of the control valve as illustrated, in FIG. 1.

During parking, the control valve works without hydraulic feedback, that is to say, only the mid-centering of the control valve must be overcome as activation moment on the steering wheel. After that, the full hydraulic support sets in to move the steered vehicle wheels (steep characteristic). Once the vehicle begins to roll, then, for the purpose of mechanical mid-centering, one must overcome an additional activation moment that is generated by the hydraulic feedback device, that depends on the pressure, and that rises along with the increasing vehicle speed (flatter characteristic). In the process, as a result of the smaller parking forces, one gets good parking comfort and, due to the feedback of the forces along the steered vehicle wheels to the steering wheel, one gets good properties also in this area when driving fast. The parking forces, however, can never be smaller than the mechanical centering forces. In case of steering corrections when driving straight ahead, however, the reaction forces appearing along the steered vehicle wheels are so small that, for reasons of driving safety at high speeds, these forces should be completely transmitted to the steering wheel. That, again, is possible only with a correspondingly high degree of mechanical mid-centering because the hydraulic support then sets in only later.

In the parking area, the mechanical centering forces should be kept as low as possible. When driving forward fast—on which occasion the servo support should be greatly reduced—one, however, desires strong mechanical mid-centering to get an exact feel of the driving action. These two requirements contradict each other. The design of the mechanical mid-centering arrangement therefore, according to the state of the art, can always be only a compromise between the two demands.

The task of the invention is so to improve the known power assisted steering system that not only the level of the hydraulic feedback but also the onset of servosupport will be controllable.

This problem has already been solved in DE-C2-32 48 252 in that an additional control edge is arranged either between the particular supply control opening and the pertinent working connection or between the supply control opening and the feedback control opening. This additional control edge generates a backup that impacts the feedback chambers with pressure without a corresponding differential pressure being generated in the working cylinder.

That results in a broadening of the characteristic curve in the lower area according to FIG. 2; this, in turn, improves road contact in case of small steering moments, that is to say, in the straight-ahead driving range.

This additional control edge lies in the mainstream and, on account of the narrow gap prevailing there, the stream has a strong laminar portion; that results in a high temperature dependence of the valve system. Besides, to build up the feedback pressure, the control valve must cover a certain distance and that path reduces the effective stiffness of the steering system precisely in the mid-area.

SUMMARY OF THE INVENTION

The solution provided by the invention at hand avoids the disadvantages of the known version in that at least one device for piling up the pressure medium stream is arranged between the feedback device and the supply to the control valve. The advantage of this version consists in the fact that the backup is not generated with the help of an additional control edge that lies in the mainstream, but rather by using the flow resistances deriving either from a choke connected in front of the supply to the control valve, a spring-loaded backup valve arranged in the same spot, or a stream-limiting valve. These advantageous and practical features of the invention are given in the subclaims.

But the invention is not confined to the combination of features given in the claims. The expert will find additional meaningful possibilities of combining claims and individual claim features deriving from the problem.

The invention will be explained in greater detail below with the help of the practical examples illustrated in the drawing.

BRIEF DESCRIPTION OF THE DRAWINGS

FIGS. 4 and 5 show two practical examples of the power assisted steering system with a cross section through a control valve made as a rotary piston valve in a schematic view;

DETAILED DESCRIPTION OF PREFERRED EMBODIMENTS

Figure 1:
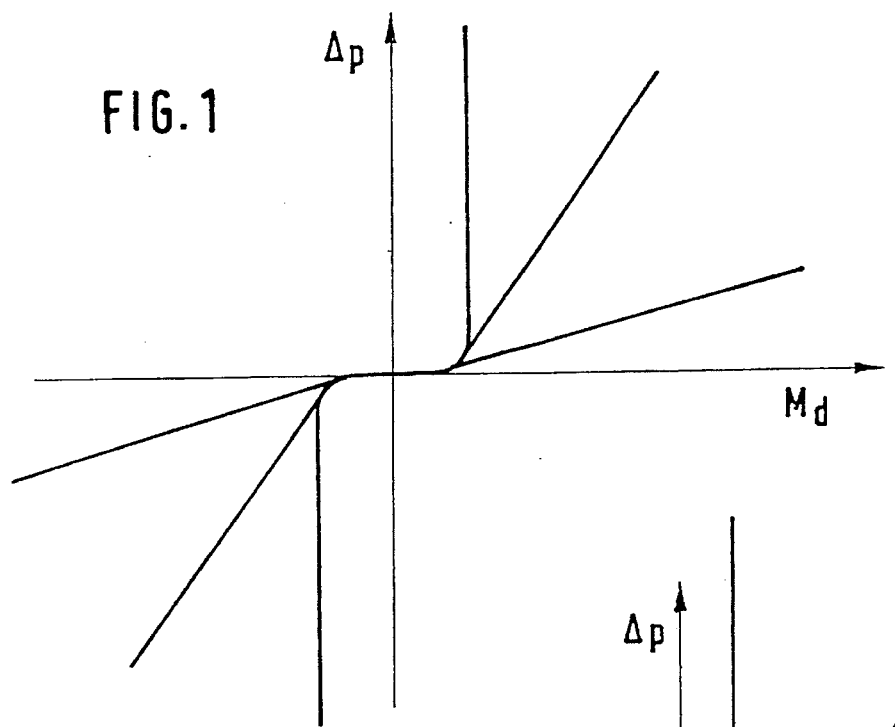
FIG. 1 is the characteristic field of a control valve with a relatively high, mechanical mid-centering.

The power assisted steering system contains—in a steering gear, not shown—a control valve 1 via which pressure medium is supplied from a servopump 3 to a servomotor 2 and via which it is fed back from there into a tank 4.

Control valve 3 is provided with a controllable feedback device 5. It is made as a four-way valve and reveals a supply connection 6, a feedback connection 7, and two working connections 8 and 10 that are connected with two lines 11 or 12, leading to the two working chambers of servomotor 2. A device 13 for piling up the pressure medium stream is arranged between feedback device 5 and supply connection 6.

In the first practical, example, control valve 1 essentially consists of a valve housing 15 that is rotatable in a steering housing 14, and in said valve housing 15, valve pistons 16 and 17 can be moved forcibly by two pins 18 and 20 of a fork-shaped end of a steering spindle, not shown. The pressure medium is supplied to control valve 1 from servopump 3 in a ring groove 21 of steering housing 14. From there, it is moved via one, each, supply connection 22 or 23 in ring grooves 24 or 25 of valve housing 15. When control valve 1 is in the neutral position, there is a connection from ring grooves 24 and 25 of valve housing 15 via one, each, supply control opening 26 or 27, a piston ring groove 28 or 30, and a feedback control opening 31 or 32 going to feedback connection 7. The supply control openings 26 and 27 and the feedback control openings 31 and 32 are shaped between valve pistons 16 and 17 and the pertinent valve boreholes.

Between supply connection 22 or 23 and feedback connection 7, there is located, in each case, a working connection 8 or 9 that, on the one hand, is connected to piston ring groove 28 or 30 and, on the other hand, to one of lines 11 or 12 leading to servomotor 2.

At least one feedback chamber is provided for each working chamber of the servomotor 2 in control valve 1. In the practical example shown in FIG. 4, at one end of each valve piston 16 or 17, there is arranged a feedback chamber 33 or 34 that borders on a face 35 or 36 of the particular valve piston 16 or 17. The feedback chambers 33 and 34 are connected—via one, each, fixed choke points 37 or 388—to ring groove 21 and thus to servopump 3.

In the practical example, control valve 1 reveals two valve pistons 16 and 17; this is why—on the faces of valve pistons 16 and 17, which are opposite the feedback chambers 33 and 34—there can be arranged two additional feedback chambers 40 and 41 that are connected via ducts 42 and 43 crosswise with feedback chambers 33 or 34.

Feedback chambers 33 and 34 can be connected via one, each, control edge pair 44 or 45—in case of a shift of valve pistons 16 and 17 out of their neutral position—with tank 4 via a control member 46. The choke cross section of control member 46 can be altered as a function of the vehicle speed. The control edge pairs are formed between valve piston 16 or 17 and one, each, housing ring groove 47 or 48. When valve pistons 16 and 17 are in the neutral position, the control edge pairs 44 and 45 reveal zero overlap.

In this practical example, the feedback device 5 is formed by the two control edge pairs 44, 45, the feedback chambers 33, 34, 40, and 41, and control member 46.

Between the fixed choke points 37 and 38, on the one hand, that are connected in front of the feedback device 5 and the supply control openings 26 and 27, on the other hand, that, in this particular practical example represent the actually effective supply connections, there is arranged the device 13 for piling up the pressure medium stream. This device for piling up the pressure medium stream is subdivided in the practical example shown in FIG. 4 and is formed by one, each, choke 50 or 51 that is connected in front of the particular supply control opening 26 or 27.

Figure 5:
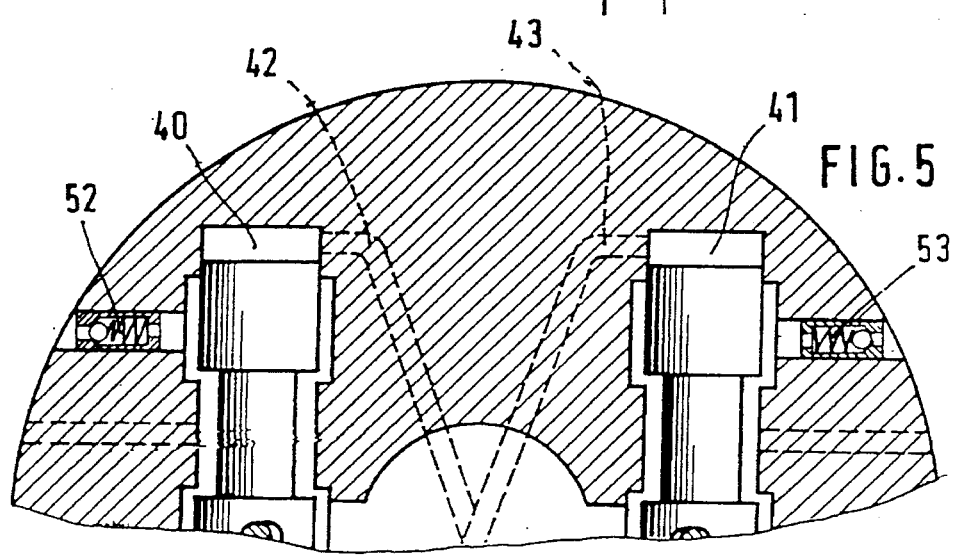

In the practical example according to FIG. 5, device 13 for piling up the pressure medium stream is formed by one, each, spring-loaded backup valve 52 or 53 that is connected in front of the particular supply control opening 26 or 27.

The operation of the power assisted steering system will be described below with the help of the practical example illustrated in FIG. 4:

In the illustrated neutral position, the pressure medium stream, first of all, passes choke 50 or 51 and supply control opening 26 or 27. Then the pressure medium stream is returned to tank 4 via the feedback control opening 31 or 32 via feedback connection 7 and, in the case of symmetrical flow conditions, via both valve pistons on lines 11 and 12, generates an equally high-pressure level which, however, is lowered by the passage resistances as compared to the supply pressure in front of the control valve.

The control edge pairs 44 and 45 on feedback chambers 33 and 34 have zero coverage in the neutral position. If one assumes that control valve 1 is in the neutral position and that control member 46 is fully opened—as happens when driving fast—then the tank pressure prevails in housing ring grooves 47 and 48 and, via control edge pairs 44 and 45 or through chokes 37 and 38, flows a more or less large control screen, depending on the quality of the zero coverage and the level of the above-described passage resistance of control valve 1. The relative gap at control edge pairs 44 and 65 will be so adjusted here that a pressure balance will prevail in feedback chambers 33 and 34. The hydraulic feedback effect is thus equal to zero.

If control valve 1 is deflected slightly, for example, in terms of a turn to the right, then the right-hand valve piston 17 moves down and the left-hand valve piston 16 moves up. As a result, control edge pair 44 is opened, while control edge pair 45 is closed. The consequence of this is a certain control stream via the fixed choke point 37 and control edge pair 44, which means a pressure drop in the feedback chambers 33 and 41. The fixed choke point 38 here has no flow so that a full supply pressure prevails in feedback chambers 33 and 40. That generates a leftward-turning hydraulic moment that counteracts the initiated rotary motion.

In connection with this very small movement, the pressure conditions along the supply control edges 26 and 27 and along the feedback control openings 31 and 32 practically do not change; this is why there is no noteworthy differential pressure rise in servomotor 2 in spite of the hydraulic feedback moment.

Figure 2:
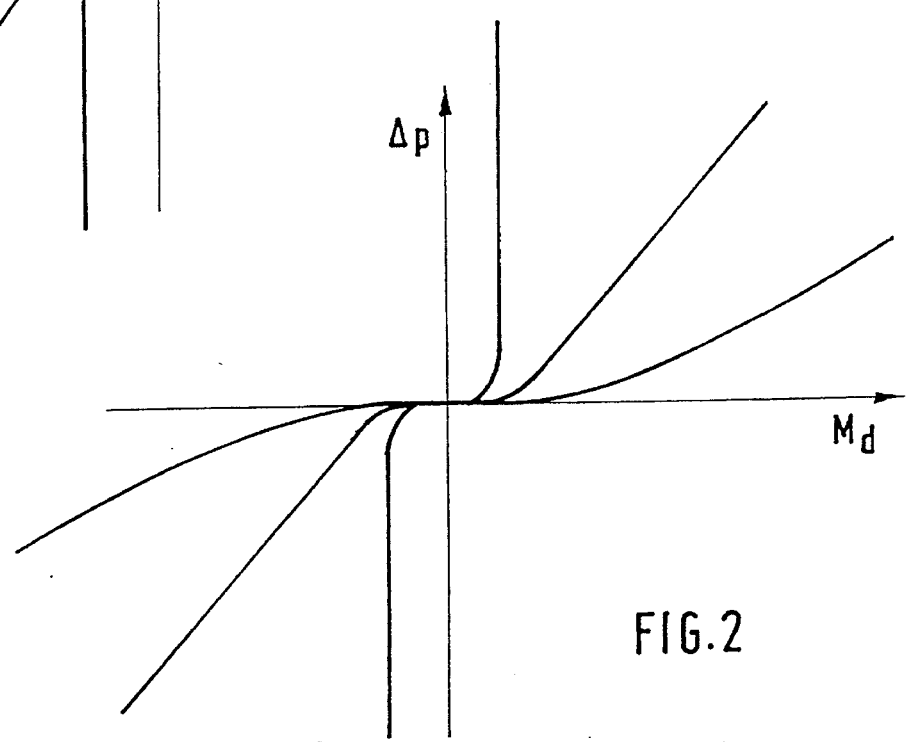
FIG. 2 is tile characteristic field of a control valve with a relatively lower, mechanical mid-centering and additional hydraulic mid-centering.

FIGS. 1 and 2 clearly show the difference between a power assisted steering system according to the above-mentioned state of the art and according to the version given in the invention. The mechanical mid-centering that is clearly shown by the steep characteristic is—in the version according to the invention shown in FIG. 2—considerably smaller than according to the state of the art shown in FIG. 1. On the other hand, the flatter characteristics in FIG. 2 have a longer horizontal portion that clearly shows the magnitude of the added-up mechanical and hydraulic centering components.

Figure 6:
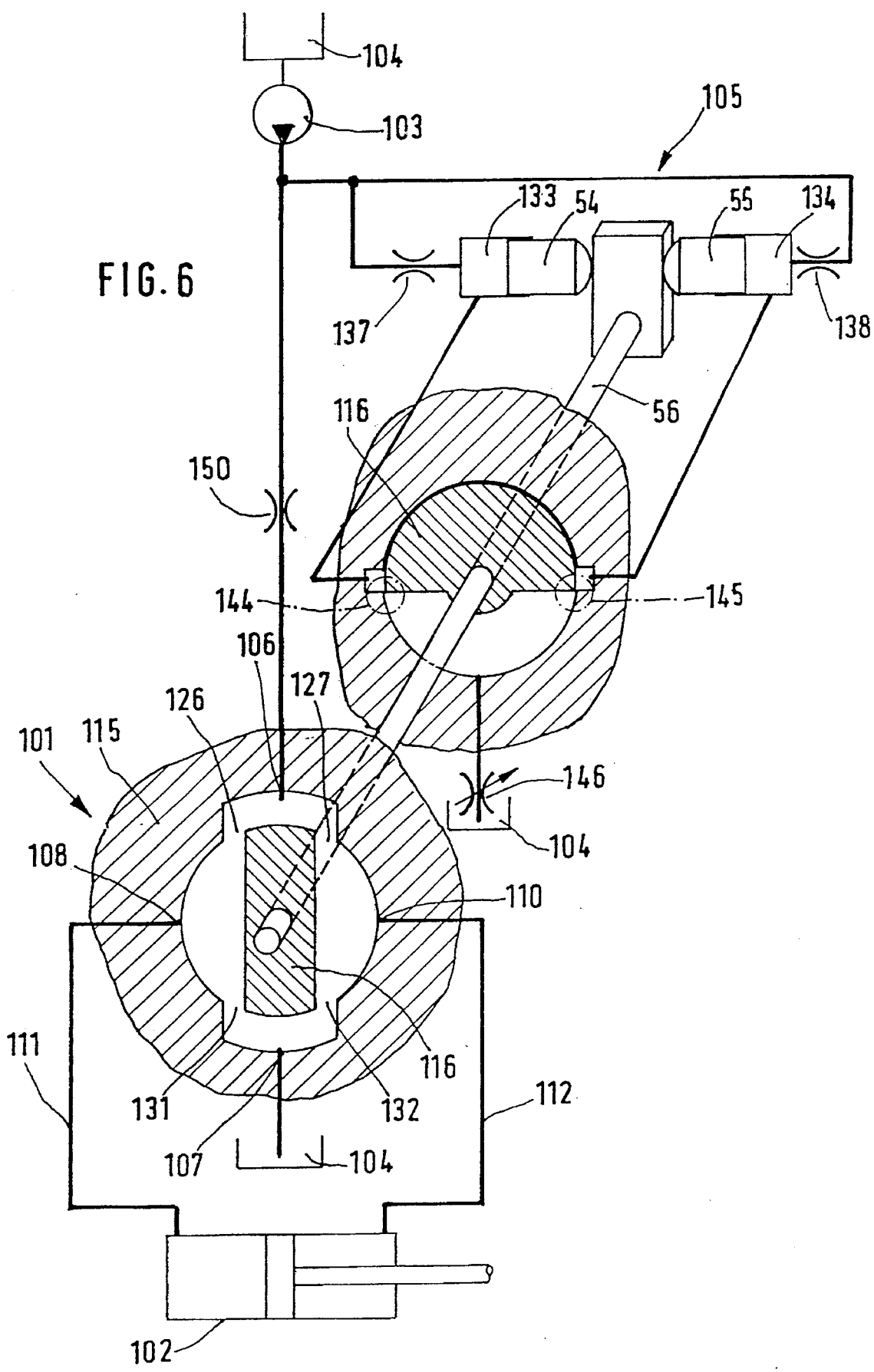
FIG. 6 is another practical example of the power assisted steering system with a control valve made as rotary slide valve in a schematic illustration.

So far, the invention has been described on the basis of practical examples of a power assisted steering system with a rotary piston valve. Control valve 1 in these practical examples contains two valve pistons 16 and 17 that can be adjusted oppositely in their axial direction. The functions of the two valve pistons 16 and 17 can be combined in one valve piston with the same effect. It is also possible, in place of a rotary piston valve, to use any other kind of four-way valves, that is to say, valves with four control edge pairs and with any feedback device, for example, a rotary slide valve. One practical example of the invention is described in the following with the help of FIG. 6, and it has a rotary slide valve. Identically operating parts here are labeled with reference numbers that are raised by 100 as compared to the numbers in FIGS. 4 and 5.

A control valve 101 contains a valve piston 116 that is made as a rotary slide and that is guided rotatably in a valve housing 115. In valve housing 115, there are arranged one supply connection 106, one feedback connection 107, and two working connections 108 and 110. Two supply control openings 126 and 127 as well as two feedback control openings 131 and 132 are illustrated in a schematic cross section through control valves 101.

Two feedback chambers 133 and 134 receive two feedback pistons 54 or 55 that act upon valve piston 116 via a connection 56 that is illustrated only schematically. The two feedback chambers 133 and 134 are connected to servopump 103 via one, each, fixed choke points 137 or 138.

Feedback chambers 133 and 134 can be connected via a control member 146 with a tank 104 via one, each, control edge pair 144 or 145 in case of a rotation of valve piston 116 out of its neutral position. Control member 146 here—as in the first two practical examples—reveals a choke cross section that can be altered as a function of the vehicle speed. Control edge pairs 144 and 145 are illustrated by control valve 101 in another schematic cross section. The connection between the two cross sections is illustrated schematically by connection 56.

A device 113 for piling up the pressure medium stream is arranged between supply control openings 126 and 127, on the one hand, and fixed choke points 137 and 138, on the other hand. This device for piling up the pressure medium stream is formed in FIG. 6 by a choke 150 that is arranged between supply connection 106 and feedback device 105. In this practical example, the feedback device is formed by the two control edge pairs 144, 145, feedback chambers 133, 134, and control member 146.

In place of choke 150, one can use a spring-loaded back-up valve as illustrated in the practical example shown in FIG. 5.

The operation of this practical example corresponds to the operation of the first two practical examples described.

In the practical examples given so far, device 13 for building up the pressure medium stream was formed either by chokes or by back-up valves. In almost all power assisted steering systems, there is a flow limiting valve by means of which the pressure medium stream—that is supplied to the power assisted steering system—as limited to a certain maximum value. Such a flow limiting value is integrated mostly in the servopump.

Figure 3:
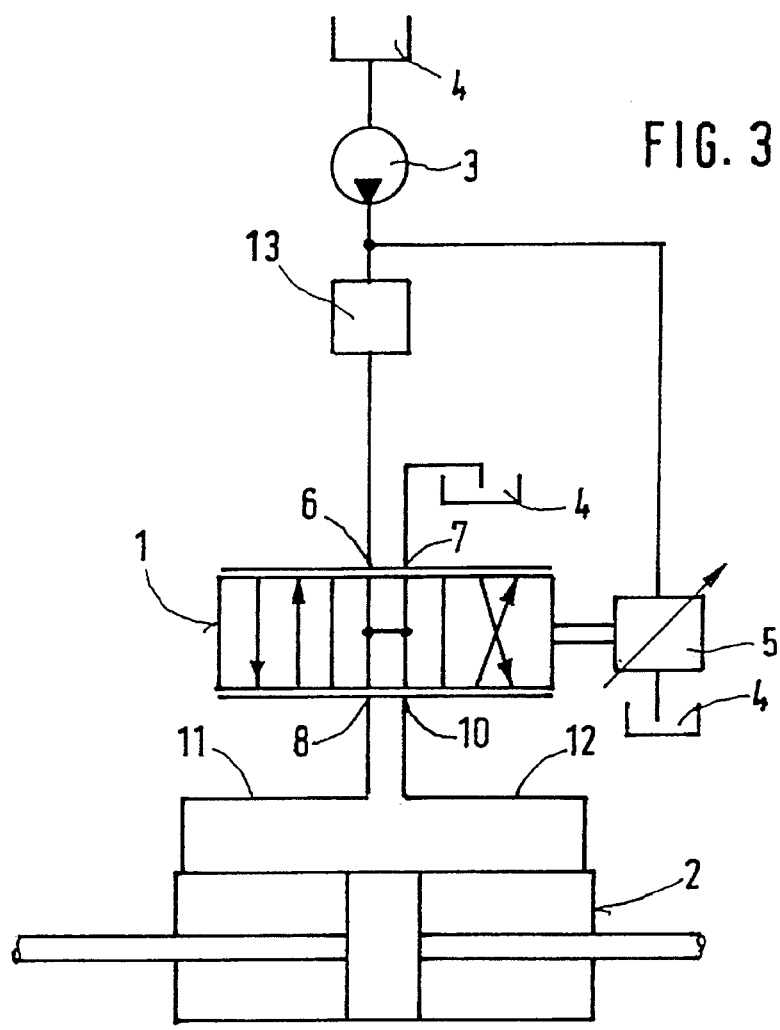
FIG. 3 shows a basic diagram of the power assisted steering system according to the invention.
Figure 3A:
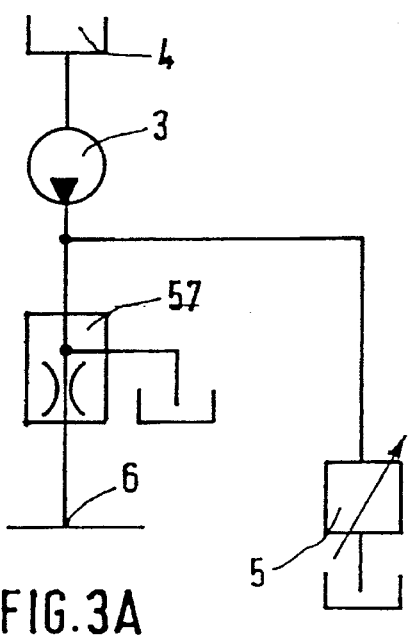
FIG. 3A and FIG. 3B are two practical examples of the power assisted steering system with different devices to pile up the pressure medium stream.

There is a pressure gradient via a pressure limiting valve; that makes it possible to use this pressure gradient also for piling up the pressure medium stream. That, in turn, makes it possible to have device 13—for piling up the pressure medium stream—formed by a flow limiting valve 57. Flow limiting valve 57 is shown in FIG. 3A.

In the practical example, control member 46 is arranged in each case on the feedback from the feedback chambers to the tank. With the same effect, however, the control member can also be inserted in the supply line from the servopump in front of the feedback chambers as is known, for example, from DE-A1-31 22 370. In this case, it is practical—in addition to the flow limiting valve 57—also to integrate control member 46 in servopump 3.

Figure 3B:
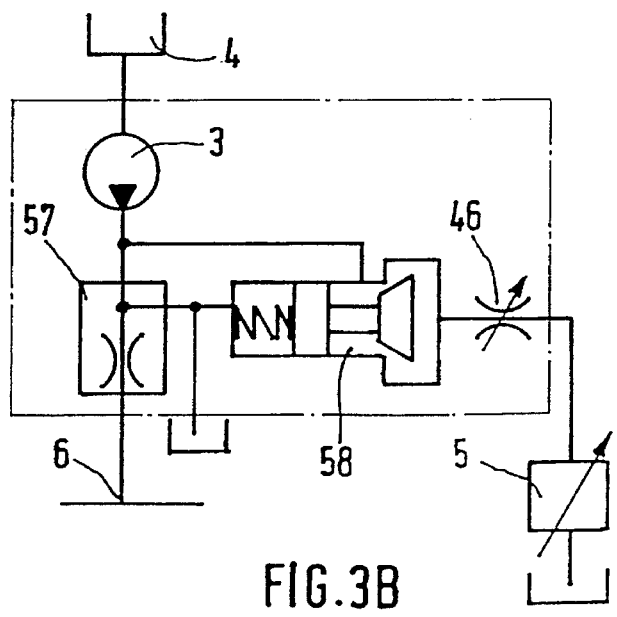

To prevent overloading control member 46, one also puts a cut-off valve 58 in the pump; this cut-off valve is also present in almost every power assisted steering system. FIG. 3B illustrates a schematic version of this solution.

I claim:

1. Power assisted steering system, especially for motor vehicles, which comprises a servomotor (2) provided with working chambers; a servopump (3) fluidly connected to the servomotor (2) via a control valve (1) and also fluidly connected to a tank (4); wherein the control valve (1) is a four-way valve having a supply connection (6; 22, 23), a feedback connection (7) and two working connections (8, 10) having lines (11, 12), respectively, each of said lines (11, 127 leading to the working chambers of said servomotor (2), said control valve (1) also including a controllable feedback device (5) connected between the servopump (3) and the supply connection (6; 22, 23) and a control member (46) for controlling the feedback device (5) and having a choke cross-section which varies as a function of vehicle speed; and a device (13) for piling up the pressure medium stream located between the feedback device (5) and the supply connection (6; 22, 23).

2. Power assisted steering system according to claim 1, characterized in that the device (13) for piling up the pressure medium stream is formed by a choke (50, 51).

3. Power assisted steering system according to claim 1, characterized in that the device (13) for piling up the pressure medium stream is formed by a spring-loaded back-up valve (52, 53).

4. Power assisted steering system according to claim 1, characterized in that the device (13) for piling up the pressure medium stream is formed by a flow limiting valve (57) that is simultaneously used as a flow limiting valve for the power assisted steering system.

5. Power assisted steering system according to claim 4, characterized in that the flow limiting valve (57) is integrated into the servopump (3).

6. Power assisted steering system according to claim 5, characterized in that the control member (46) is integrated into the servopump (3).

7. Power assisted steering system according to claim 6, characterized in that a cut-off valve (58) is connected in front of the control member (46).

* * * * *